(12) United States Patent
Cherepinsky et al.

(10) Patent No.: US 10,351,230 B2
(45) Date of Patent: Jul. 16, 2019

(54) INITIAL ROTOR STATE COMPENSATION FOR A ROTORCRAFT

(71) Applicant: SIKORSKY AIRCRAFT CORPORATION, Stratford, CT (US)

(72) Inventors: Igor Cherepinsky, Sandy Hook, CT (US); Joseph T. Driscoll, Prospect, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/329,118

(22) PCT Filed: Jul. 17, 2015

(86) PCT No.: PCT/US2015/040899
§ 371 (c)(1),
(2) Date: Jan. 25, 2017

(87) PCT Pub. No.: WO2016/048437
PCT Pub. Date: Mar. 31, 2016

(65) Prior Publication Data
US 2017/0210466 A1    Jul. 27, 2017

Related U.S. Application Data

(60) Provisional application No. 62/053,892, filed on Sep. 23, 2014.

(51) Int. Cl.
*G05D 1/06* (2006.01)
*B64C 27/57* (2006.01)
(Continued)

(52) U.S. Cl.
CPC ............ *B64C 27/57* (2013.01); *B64C 13/503* (2013.01); *B64C 27/06* (2013.01); *B64C 27/68* (2013.01); *G05D 1/0669* (2013.01)

(58) Field of Classification Search
CPC ....... B64C 27/57; B64C 13/503; B64C 27/06; B64C 27/68; G05D 1/0669
See application file for complete search history.

(56) References Cited

U.S. PATENT DOCUMENTS 3,096,046 A * 7/1963 Kendall, Jr. ......... G05D 1/0033
244/17.13
3,472,471 A * 10/1969 Badewitz ................ B64G 1/62
244/1 R (Continued)

OTHER PUBLICATIONS

International Search Report and Written Opinion; International Application No. PCT/US2015/040899; International Filing Date: Dec. 10, 2015; dated Jan. 13, 2016; 11 Pages.

*Primary Examiner* — Behrang Badii
*Assistant Examiner* — Daniel L Greene
(74) *Attorney, Agent, or Firm* — Cantor Colburn LLP

(57) ABSTRACT

According to one aspect, a method of initial rotor state compensation for a rotorcraft includes determining a vehicle attitude of the rotorcraft prior to takeoff of the rotorcraft. A rotor state compensation is computed based on the vehicle attitude. A plurality of rotor servos is commanded to an initial rotor state based on a nominal rotor neutral position value in combination with the rotor state compensation to establish a predetermined takeoff trajectory of the rotorcraft.

14 Claims, 4 Drawing Sheets

(51) Int. Cl.
*B64C 13/50* (2006.01)
*B64C 27/06* (2006.01)
*B64C 27/68* (2006.01)

(56) References Cited

U.S. PATENT DOCUMENTS

| | | | |
|---|---|---|---|
| 3,691,356 A * | 9/1972 | Miller | G05D 1/0661 |
| | | | 244/181 |
| 4,947,334 A | 8/1990 | Massey et al. | |
| 5,001,646 A | 3/1991 | Cladwell et al. | |
| 9,527,588 B1 * | 12/2016 | Rollefstad | B64C 39/024 |
| 9,849,999 B1 * | 12/2017 | Fymat | B64D 45/00 |
| 2004/0245378 A1 | 12/2004 | Nonami et al. | |
| 2008/0249672 A1 | 10/2008 | Cherepinsky | |

* cited by examiner

INITIAL ROTOR STATE COMPENSATION FOR A ROTORCRAFT

CROSS REFERENCE TO RELATED APPLICATIONS

This application is a National Stage application of PCT/US2015/040899, filed Jul. 17, 2015, which claims the benefit of U.S. Provisional Application No. 62/053,892, filed Sep. 23, 2014, both of which are incorporated by reference in their entirety herein.

GOVERNMENT RIGHTS

This invention was made with government support under contract number W58RGZ-06-D-0045 awarded by the United States Army. The government has certain rights in the invention.

BACKGROUND OF THE INVENTION

The subject matter disclosed herein relates to rotorcraft control systems, and in particular to determining an initial rotor state compensation for a rotorcraft at takeoff.

A fly-by-wire (FBW) rotorcraft, such as a helicopter, provides high levels of augmentation that enhances safety and greatly reduces pilot workload compared to conventional mechanical and hydro-mechanical flight control systems. To achieve these improvements, one of the changes is removal of direct correlation between cyclic control position and cyclic pitch of rotor blades. This allows implementation of various high-level modes of operation. For example, an attitude command/attitude bold mode provides correlation between aircraft attitude and cyclic control position. Cyclic pitch of rotor blades can be controlled in lateral and longitudinal directions to control sideways and forward/backward movement in hover flight.

While a FBW flight control system can provide great benefits when the rotorcralt is airborne, ground operations can become more cumbersome. During ground operations, in conventional rotorcraft, pilots typically rely upon cyclic control position as a rotor position cue. This allows pilots to correctly position the rotor for various takeoff conditions. In FBW rotorcraft, pilots typically try to determine rotor position (i.e., cyclic pitch) by directly looking at the tip path. This can be effective but adds to pilot workload and may not precisely correct for a number of conditions.

BRIEF DESCRIPTION OF THE INVENTION

According to an aspect of the invention, a method of initial rotor state compensation for a rotorcraft includes determining a vehicle attitude of the rotorcraft prior to takeoff of the rotorcraft. A rotor state compensation is computed based on the vehicle attitude. A plurality of rotor servos is commanded to an initial rotor state based on a nominal rotor neutral position value in combination with the rotor state compensation to establish a predetermined takeoff trajectory of the rotorcralt.

In addition to one or more of the features described above or below, or as an alternative, further embodiments could include where the rotorcraft is a fly-by-wire rotorcraft, and the rotor servos are electronically commanded to adjust a cyclic pitch of a rotor of the rotorcraft.

In addition to one or more of the features described above or below, or as an alternative, further embodiments could include determining a landing surface slope profile based on the vehicle attitude prior to takeoff, and computing the rotor state compensation as one or more servo biasing adjustments to compensate for a difference between the landing surface slope profile and a nominal flat surface.

In addition to one or more of the features described above or below, or as an alternative, further embodiments could include where the predetermined takeoff trajectory is set as a closest achievable pure vertical takeoff.

In addition to one or more of the features described above or below, or as an alternative, further embodiments could include applying a low-pass filter to the vehicle attitude, latching a low-pass filtered version of the vehicle attitude based on detecting a takeoff condition, and providing a latched low-pass filtered version of the vehicle attitude as the vehicle attitude for computing, the rotor state compensation.

In addition to one or more of the features described above or below, or as an alternative, further embodiments could include determining a wind speed and direction prior to takeoff and applying a low-pass filter to the wind speed and direction. A low-pass filtered version of the wind speed and direction can be latched based on detecting the takeoff condition. The rotor state compensation can be adjusted based on a latched low-pass filtered version of the wind speed and direction.

In addition to one or more of the features described above or below, or as an alternative, further embodiments could include monitoring a weight-on-wheels indicator and a collective control of the rotorcraft and detecting the takeoff condition based on a change in the collective control and a change in the weight-on-wheels indicator from a weight-on-wheels condition to a no weight-on-wheels condition.

In addition to one or more of the features described above or below, or as an alternative, further embodiments could include where the nominal rotor neutral position value defines baseline servo command values for a collective position, a lateral cyclic position, and a longitudinal cyclic position of the rotorcraft for a flat surface vertical takeoff.

In addition to one or more of the features described above or below, or as an alternative, further embodiments could include where computing the rotor state compensation further includes computing a tail rotor compensation, and commanding the plurality of rotor servos to the initial rotor state includes determining a nominal tail rotor neutral position value in combination with the tail rotor compensation to establish the predetermined takeoff trajectory of the rotorcraft.

According to further aspects of the invention, a system for initial rotor state compensation of a rotorcraft. The system includes a processor and memory having instructions stored thereon that, when executed by the processor, cause the system to determine a vehicle attitude of the rotorcraft prior to takeoff of the rotorcraft. A rotor state compensation is computed based on the vehicle attitude. A plurality of rotor servos is commanded to an initial rotor stale based on a nominal rotor neutral position value in combination with the rotor state compensation to establish a predetermined takeoff trajectory of the rotorcraft.

BRIEF DESCRIPTION OF THE DRAWINGS

The present disclosure is illustrated by way of example and not limited in the accompanying figures in which like reference numerals indicate similar elements.

DETAILED DESCRIPTION OF THE INVENTION

Figure 1:
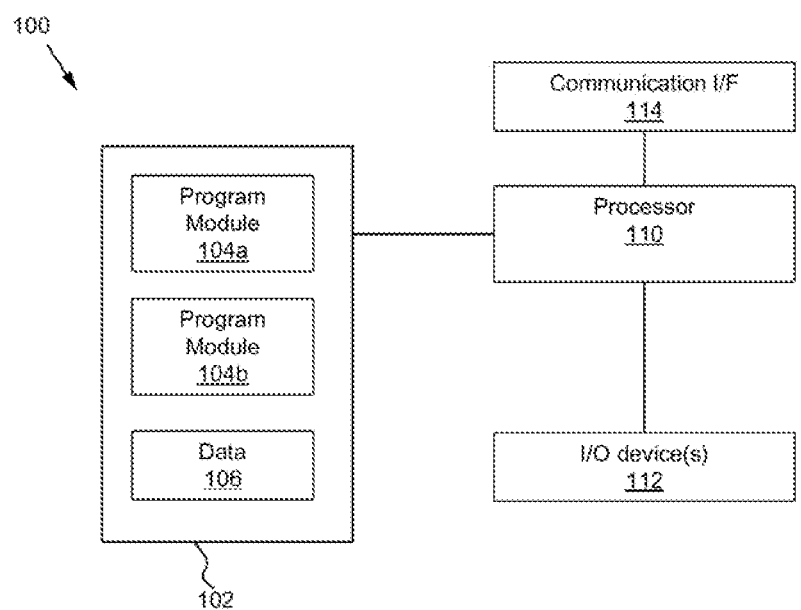
FIG. 1 is a schematic block diagram illustrating an exemplary computing system according to an embodiment of the invention.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of systems and methods are described for initial rotor state compensation of a rotorcraft. A rotorcraft can include one or inure main rotors and can also include a tail rotor, a pusher propeller, and/or other stabilization systems. A fly-by-wire (FBW) control system is provided that receives piloting control inputs from human-driven and/or machine-driven controls and translates the piloting control inputs into commands to augment various flight surfaces of the rotorcraft. The FBW control system may also translate piloting inputs into engine control commands. When the rotorcraft is positioned on a level takeoff surface, a nominal neutral rotor position for achieving a substantially pare vertical takeoff can be established using, for instance, a lookup table to determine servo commands to correctly position one or more rotors at takeoff. Embodiments further enhance rotorcraft performance and reduce pilot workload by sensing external factors that influence neutral rotor position, computing a compensation value to achieve a neutral rotor position, and adjusting the one or more rotors during takeoff to establish a predetermined takeoff trajectory of the rotorcraft based on the nominal rotor neutral position value in combination with the rotor state compensation.

Referring to FIG. 1, an exemplary computing system 100 implemented on a rotary wing aircraft, rotorcraft 200 (FIG. 2) is shown. The system 100 is shown as including, a memory 102. The memory 102 may store executable instructions. The executable instructions may be stored or organized in any manner and at any level of abstraction, such as in connection with one or more processes, routines, methods, etc. As an example, at least a portion of the instructions is shown in FIG. 1 as being associated with a first program module 104a and a second program module 104b. The memory 102 may include random access memory (RAM), read only memory (ROM), or other electronic, optical, magnetic, or a combination of RAM, ROM, or other computer readable medium in the same or different locations connected over a network.

The memory 102 may be configured to store data 106. Data 106 may include data originating from one or more sources. The data 106 may pertain to one or more parameters, such as nominal rotor neutral position values, thresholds, filter constants, profiles, various predetermined values and tables, etc.

The instructions stored in the memory 102 may be executed by one or more processors, such as a processor 110. The processor 110 can be any type of processing circuitry known in the art, such as a microprocessor, microcontroller, digital signal processor, programmable logic device, application specific integrated circuit, field programmable gate array, or the like. The processor 110 may be configured to process the data 106. It is to be understood that the data 106 may be stored on separate media from the program modules 104a, 104b.

The processor 110 may be coupled to one or more input/output (I/O) devices 112. In some embodiments, the I/O device(s) 112 may include one or more of a sensor, actuator, piloting control, keyboard or keypad, a touchscreen or touch panel, a display screen, a microphone, a speaker, a mouse, a button, a remote control, a joystick, etc. The I/O device(s) 112 may be configured to provide an interface to allow a user or another entity (e.g., another computing entity) to interact with the system 100. The I/O device(s) 112 may also be configured to transmit or receive sensor data and/or commands to the processor 110.

Figure 2:
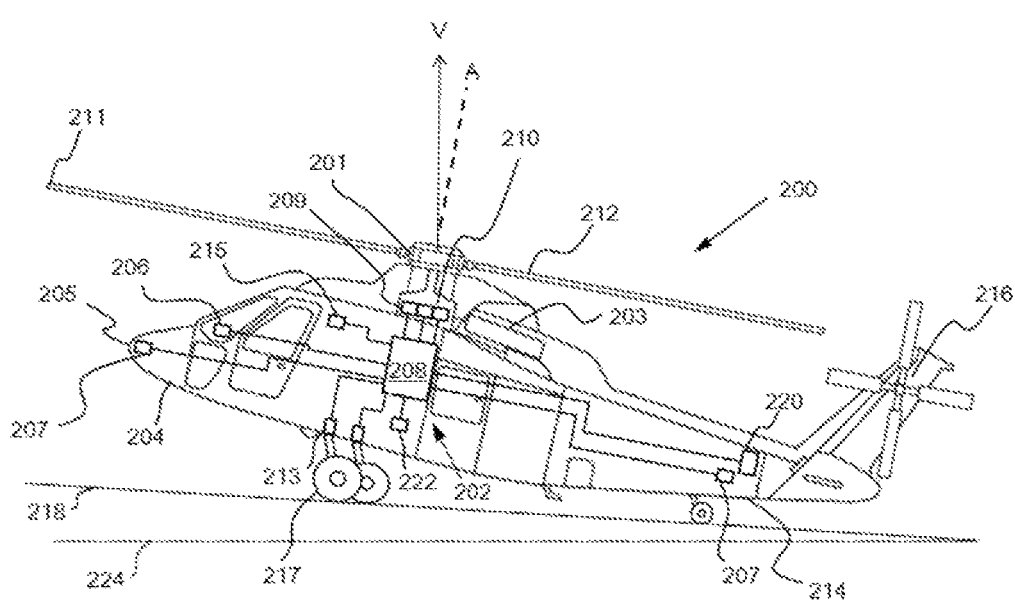
FIG. 2 illustrates a system for initial rotor state compensation on a rotorcraft according to an embodiment of the invention.

A communication interface 114 may support communication with systems that are external to the rotorcraft 200 (FIG. 2). For example, the communication interface 114 may be used to upload values to the data 106, to update the program modules 104a and 104b, and/or to augment data sent and received with respect to the I/O devices 112.

The system 100 is illustrative. In some embodiments, one or more of the entities may be optional. In some embodiments, additional entities not shown may be included. In some embodiments, the entities may be arranged or organized in a manner different from what is shown in FIG. 1. One or more of the entities shown in FIG. 1 may be associated with one or more of the devices or entities described herein.

In one embodiment, program module 104a provides baseline flight control processing, and program module 104b can augment values produced by program module 104a in predetermined operational modes of the system 100. For example, the first program module 104a may produce nominal flight control values during all modes of operation of the system 100, while the second program module 104b may execute prior to and during a takeoff sequence of the rotorcraft 200 (FIG. 2). Alternatively, the program module 104a and 104b may be combined or further subdivided.

FIG. 2 illustrates a system 202 for initial rotor state compensation on a rotary wing aircraft (or rotorcraft) 200 according to an embodiment of the invention. The system 202 may be implemented in connection with the system 100 of FIG. 1 on rotorcraft 200 as illustrated, but the invention is not limited thereto.

As illustrated in FIG. 2, rotorcraft 200 includes an airframe 204 with an extending tail 214 and a tail rotor 216 located thereon. While the embodiment of the rotorcraft 200 described herein includes an extending tail 214 and tail rotor 216, it is to be appreciated that the disclosure herein may be applied to other types of helicopters, as well as rotorcraft 200 of other configurations, including human-piloted, optionally-piloted, and unmanned aerial vehicles. A main rotor assembly for rotor) 201 is located at the airframe 204 and rotates about a main rotor axis A. The main rotor assembly 201 is driven by one or more engines 203 which cause rotation of blades 212 to provide lift and thrust to the airframe 204. The airframe 204 is lifted by the main rotor assembly 201 and houses a number of components and systems that assist in providing FBW flight control for the rotorcraft 200. Not shown for simplicity are other elements associated with the rotorcraft 200, such as an ermine transmission system including a gearbox, etc.

The system 202 includes a controller 208, which may include the processor 110, memory 102, and communication interface 114 of FIG. 1. In an embodiment, the controller 208 is a flight control computer that provides FBW control for the rotorcraft 200. The controller 208 may be coupled to various I/O devices 112 of FIG. 1, which can include rotor servos 209 that actuate a rotor positioning system 210, such as a swashplate assembly, rotor controlling lateral cyclic pitch, longitudinal cyclic pitch, and a collective angle of attack of the blades 212. Other I/O devices 112 of FIG. 1 that may be coupled to the controller 208 can include one or more of: piloting control inputs 206, inertial measurement units 207, weight-on-wheels sensors 213, and various other sensors 215. The piloting control inputs 206 can include desired cyclic and collective values generated by a human or machine pilot of the rotorcraft 200. The inertial measurement units (IMUs) 207 can be configured to provide navigational guidance information and vehicle attitude (e.g., roll, pitch, yaw) of the rotorcraft 200. One or more IMUs 207 may be located in the nose section 205 and/or extending tail 214 of the airframe 204. The weight-on-wheels sensors 213 may provide discrete weight/no-weight signals, indicating whether or not wheels 217 are on landing surface 218. The various other sensors 215 can include one or more of a gyroscope, accelerometer, or other sensor type known in the art from which vehicle attitude of the rotorcraft 200 can be directly determined or derived. The sensors 215 may also include other vehicle condition sensors, such as a wind speed and direction sensor or sensors.

The controller 208 can also interface with a tail rotor controller 220 that is operable to control blade positioning of the tail rotor 216. Alternatively, the controller 208 can directly command one or more tail rotor servos (not depicted) to control blade positioning of the tail rotor 216.

The controller 208 may also be coupled to a communication system 222 via the communication interface 114 of FIG. 1. The communication system 222 can support data exchange with various other computer systems (not depicted) on the rotorcraft 200 and/or support communication with systems external to the rotorcraft 200. In one embodiment, a ground station equipped with wind speed and direction sensing (not depicted) can provide wind speed and direction information associated with the landing surface 218 to the controller 208 of the rotorcraft 200.

In exemplary embodiments, rather than attempting to observe a path of blade tips 211 of the blades 212, the controller 208 can determine a vehicle attitude of the rotorcraft 200 prior to takeoff. A rotor state compensation value can be computed by the controller 208 based on the vehicle attitude, and the rotor servos 209 are commanded based on a nominal rotor neutral position value in combination with the rotor state compensation to establish a predetermined takeoff trajectory of the rotorcraft 200. The nominal rotor neutral position value may be defined as command values for the rotor servos 209 to achieve a closest achievable pure vertical takeoff (V) from a nominal flat surface 224. Where the landing surface 218 has a sloped profile, which may vary in three-dimensions, the controller 208 determines the rotor state compensation to account for the difference between the landing surface 218 and nominal flat surface 224 such that a closest achievable pure vertical takeoff (V) can be achieved without additional pilot workload. The controller 208 may also compensate for wind speed and direction in computing the rotor state compensation.

Figure 3:
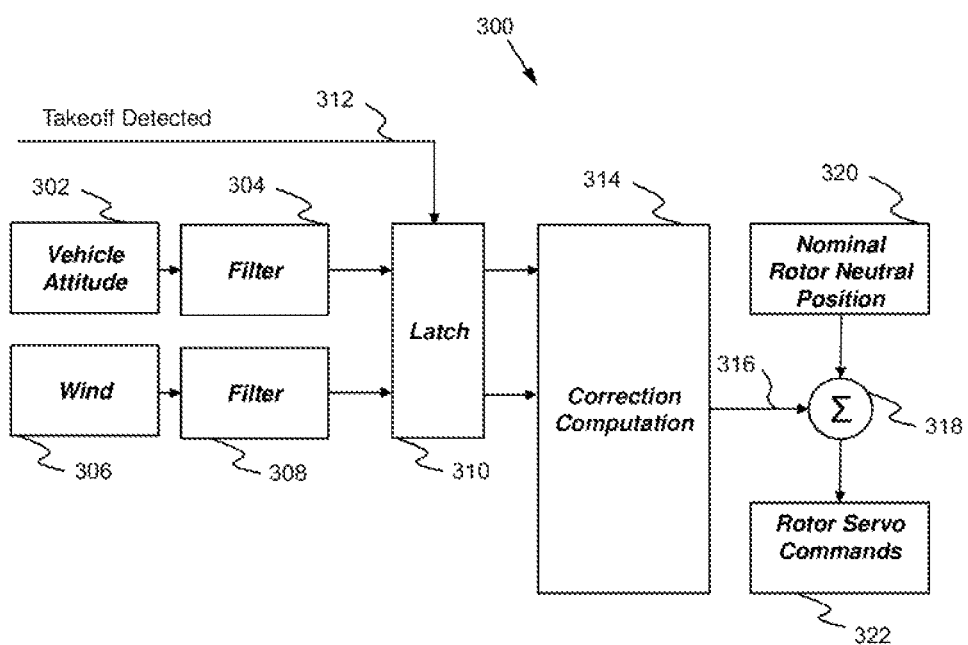
FIG. 3 illustrates a block diagram of a dataflow for initial rotor state compensation according to an embodiment of the invention.

Referring now to FIG. 3, a block diagram of a dataflow 300 for initial rotor state compensation is depicted according to an embodiment. The dataflow 300 may be implemented by the controller 208 of FIG. 2 and/or the system 100 of FIG. 1. The controller 208 of FIG. 2 can determine vehicle attitude 302 using one or more of the IMUs 207 and/or sensors 215 of FIG. 2 to establish a landing surface profile of landing surface 218, including latitudinal and longitudinal slope relative to a coordinate axis of the rotorcraft 200 of FIG. 2. A low-pass filter 304 can be applied to the vehicle attitude 302 to smooth out inconsistencies in the vehicle attitude 302, which may be due to wind or vibration of the rotorcraft 200 of FIG. 2. Similarly a wind speed and direction 306 may be provided by the controller 208 based on sensors 215 of FIG. 2 or data received via the communication system 222 of FIG. 2. A low-pass filter 308 can be applied to the wind speed and direction 306 to smooth out the effects of wind gusts. A latch 310 can capture values of both a low-pass filtered version of the vehicle attitude 302 and a low-pass filtered version of the wind speed and direction 306 at the same time based on a takeoff detected 312.

The takeoff detected 312 may be determined by another system of the rotorcraft 200 of FIG. 2 or determined by the controller 208 of FIG. 2. For example, the controller 208 of FIG. 2 can monitor a weight-on-wheels indicator of the weight-on-wheels sensors 213 and a collective control from the piloting control inputs 206 of the rotorcraft 200 of FIG. 2. The controller 208 of FIG. 2 may detect the takeoff condition and assert takeoff detected 312 based on a change in the collective control and a change in the weight-on-wheels indicator from a weight-on-wheels condition to a no weight-on-wheel s condition.

The dataflow 300 also includes a correction computation block 314 that may receive the latched low-pass filtered version of the vehicle attitude 302 and latched low-pass filtered version of the wind speed and direction 306. The correction computation block 314 can include one or more lookup tables or transfer functions to determine a landing surface slope profile based on the vehicle attitude 302 prior to takeoff, which is the low-pass filtered version of the vehicle attitude 302 latched upon assertion of takeoff detected 312. The correction computation block 314 can compute a rotor state compensation 316 as one or more servo biasing adjustments to compensate for a difference between the landing surface slope profile and a nominal flat surface using one or more lookup tables or transfer functions. The correction computation block 314 can also adjust the rotor state compensation 316 based on a latched low-pass filtered version of the wind speed and direction 306. In some embodiments, the correction computation block 314 computes a tail rotor compensation to command one or more rotor servos to an initial rotor state that includes a nominal tail rotor neutral position value in combination with the tail rotor compensation as part of establishing a predetermined takeoff trajectory of the rotorcraft. Alternatively, the correction computation block 314 only receives and acts upon the latched low-pass filtered version of the vehicle attitude 302 and performs compensation relative to the main rotor assembly 201 of FIG. 2.

The rotor state compensation 316 that is output by the correction computation block 314 may be combined at a summing junction 318 with a nominal rotor neutral position value 320 to establish a predetermined takeoff trajectory of the rotorcraft as reflected in rotor servo commands 322. In one embodiment, program module 104a of FIG. 1 determines the nominal rotor neutral position value 320 according to a known control law or lookup table. The correction computation block 314 may be part of program module 104B of FIG. 1. The rotor servo commands 322 can be output to the rotor servos 209 and/or the tail rotor controller 220 of FIG. 2. The predetermined takeoff trajectory may define a closest achievable pure vertical takeoff (V) for the rotorcraft 200 of FIG. 2. Alternatively, a different trajectory may be selected other as the predetermined takeoff trajectory other than a purely vertical direction.

Figure 4:
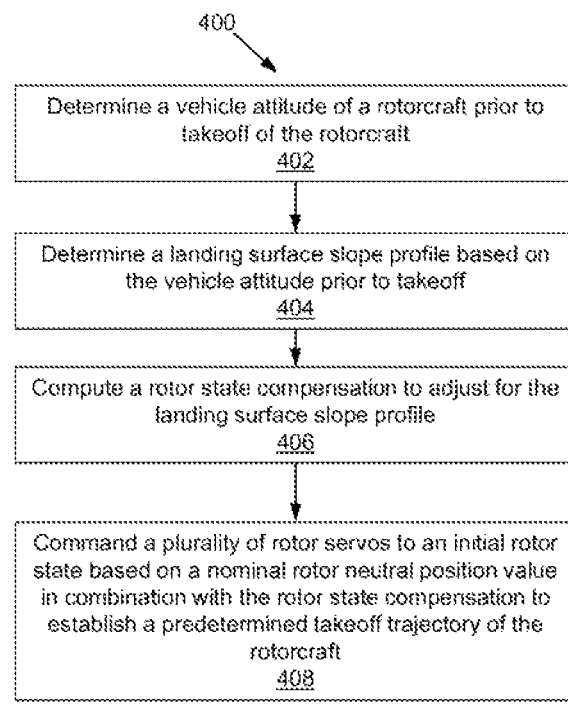
FIG. 4 is a flow chart of an exemplary method according to an embodiment of the invention.

Turning to FIG. 4 with continued reference to FIGS. 1-3, a flow chart of an exemplary method 400 is shown. The method 400 may be executed in connection with one or more entities, components, devices, or systems, such as those described herein. The method 400 may be used to provide initial rotor state compensation for a rotorcraft, such as for rotorcraft 200.

At block 402, a vehicle attitude of the rotorcraft 200 is determined prior to takeoff. As described in reference to FIG. 2, the rotorcraft 200 is a fly-by-wire rotorcraft, and the rotor servos 209 are electronically commanded to adjust a cyclic pitch of a main rotor assembly 201 of the rotorcraft 200.

At block 404, a landing surface 218 slope profile is determined based on the vehicle attitude 302 prior to takeoff (e.g., value latched when takeoff detected 312 triggers latch 310). At block 406, a rotor state compensation 316 is determined based on the vehicle attitude 302. For instance, the rotor state compensation 316 can be computed as one or more servo biasing adjustments to compensate for a difference between the landing surface 218 slope profile and a nominal flat surface 224. As described in reference to FIG. 3, a low-pass filter 304 can be applied to the vehicle attitude 302. A low-pass filtered version of the vehicle attitude 302 may be latched based on detecting a takeoff condition at latch 310, and a latched low-pass filtered version of the vehicle attitude 302 can be provided as the vehicle attitude 302 for computing the rotor state compensation 316 by the correction computation block 314. Additionally, a wind speed and direction 306 may be determined prior to takeoff (e.g., value latched when takeoff detected 312 triggers latch 310). A low-pass filter 308 can be applied to the wind speed and direction 306. A low-pass filtered version of the wind speed and direction 306 may be latched based on detecting the takeoff condition, and the rotor state compensation 316 can be adjusted based on a latched low-pass filtered version of the wind speed and direction 306. The controller 208 can monitor a weight-on-wheels indicator and a collective control of the rotorcraft 200. The takeoff condition can be detected based on a change in the collective control and a change in the weight-on-wheels indicator from a weight-on-wheels condition to a no weight-on-wheels condition, as indicated by takeoff detected 312.

At block 408, the controller 208 commands a plurality of rotor servos 209 to an initial rotor state based on a nominal rotor neutral position value 320 in combination with the rotor state compensation 316 to establish a predetermined takeoff trajectory of the rotorcraft 200. The controller 208 may also compute the rotor state compensation 316 by computing a tail rotor compensation for tail rotor 216, where the rotor servo commands 322 are commanded to an initial rotor state that also includes determining a nominal tail rotor neutral position value in combination with the tail rotor compensation to establish the predetermined takeoff trajectory of the rotorcraft 200. The predetermined takeoff trajectory may be set as a closest achievable pure vertical takeoff (V).

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method of initial rotor state compensation for a rotorcraft, the method comprising:
   determining a vehicle attitude of the rotorcraft prior to takeoff of the rotorcraft;
   determining at least one of a wind speed and wind direction prior to takeoff of the rotorcraft;
   computing a rotor state compensation based on the vehicle attitude and the at least one of wind speed and wind direction; and
   commanding a plurality of rotor servos to an initial rotor state based on a nominal rotor neutral position value in combination with the rotor state compensation to establish a predetermined takeoff trajectory of the rotorcraft, wherein the predetermined takeoff trajectory is set as a closest achievable pure vertical takeoff.

2. The method of claim 1, wherein the rotorcraft is a fly-by-wire rotorcraft, and the rotor servos are electronically commanded to adjust a cyclic pitch of a rotor of the rotorcraft.

3. The method of claim 1, further comprising:
   determining a landing surface slope profile based on the vehicle attitude prior to takeoff; and
   computing the rotor state compensation as one or more servo biasing adjustments to compensate for a difference between the landing surface slope profile and a nominal flat surface.

4. The method of claim 1, further comprising:
   applying a low-pass filter to the vehicle attitude;
   latching a low-pass filtered version of the vehicle attitude based on detecting a takeoff condition; and
   providing a latched low-pass filtered version of the vehicle attitude as the vehicle attitude for computing the rotor state compensation.

5. The method of claim 4, further comprising:
   applying a low-pass filter to the wind speed and direction;
   latching a low-pass filtered version of the wind speed and direction based on detecting the takeoff condition; and adjusting the rotor state compensation based on a latched low-pass filtered version of the wind speed and direction.

6. The method of claim 4, further comprising:
monitoring a weight-on-wheels indicator and a collective control of the rotorcraft; and
detecting the takeoff condition based on a change in the collective control and a change in the weight-on-wheels indicator from a weight-on-wheels condition to a no weight-on-wheels condition.

7. The method of claim 1, wherein the nominal rotor neutral position value defines baseline servo command values for a collective position, a lateral cyclic position, and a longitudinal cyclic position of the rotorcraft for a flat surface vertical takeoff.

8. The method of claim 7, wherein computing the rotor state compensation further comprises computing a tail rotor compensation, and commanding the plurality of rotor servos to the initial rotor state includes determining a nominal tail rotor neutral position value in combination with the tail rotor compensation to establish the predetermined takeoff trajectory of the rotorcraft.

9. A system for initial rotor state compensation of a rotorcraft, the system comprising:
a processor; and
memory having instructions stored thereon that, when executed by the processor, cause the system to:
determine a vehicle attitude of the rotorcraft prior to takeoff of the rotorcraft;
determining at least one of a wind speed and wind direction prior to takeoff of the rotorcraft;
compute a rotor state compensation based on the vehicle attitude and the at least one of wind speed and wind direction; and
command a plurality of rotor servos to an initial rotor state based on a nominal rotor neutral position value in combination with the rotor state compensation to establish a predetermined takeoff trajectory of the rotorcraft, wherein the predetermined takeoff trajectory is set as a closest achievable pure vertical takeoff.

10. The system of claim 9, wherein the rotorcraft is a fly-by-wire rotorcraft, and the rotor servos are electronically commanded to adjust a cyclic pitch of a rotor of the rotorcraft.

11. The system of claim 9, wherein the instructions further cause the system to:
determine a landing surface slope profile based on the vehicle attitude prior to takeoff; and
compute the rotor state compensation as one or more servo biasing adjustments to compensate for a difference between the landing surface slope profile and a nominal flat surface.

12. The system of claim 9, wherein the instructions further cause the system to:
apply a low-pass filter to the vehicle attitude;
latch a low-pass filtered version of the vehicle attitude based on detecting a takeoff condition; and
provide a latched low-pass filtered version of the vehicle attitude as the vehicle attitude for computing the rotor state compensation.

13. The system of claim 12, wherein the instructions further cause the system to:
apply a low-pass filter to the wind speed and direction;
latch a low-pass filtered version of the wind speed and direction based on detecting the takeoff condition; and
adjust the rotor state compensation based on a latched low-pass filtered version of the wind speed and direction.

14. The system of claim 12, wherein the instructions further cause the system to:
monitor a weight-on-wheels indicator and a collective control of the rotorcraft; and
detect the takeoff condition based on a change in the collective control and a change in the weight-on-wheels indicator from a weight-on-wheels condition to a no weight-on-wheels condition.

* * * * *